United States Patent
Dalal et al.

(10) Patent No.: US 10,884,876 B2
(45) Date of Patent: Jan. 5, 2021

(54) SYSTEMS AND METHODS FOR PERFORMING A DATABASE BACKUP FOR REPAIRLESS RESTORE

(71) Applicant: Veritas Technologies LLC, Mountain View, CA (US)

(72) Inventors: Chirag Dalal, Pune (IN); Vaijayanti Bharadwaj, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 320 days.

(21) Appl. No.: 15/905,855

(22) Filed: Feb. 27, 2018

(65) Prior Publication Data

US 2019/0266057 A1    Aug. 29, 2019

(51) Int. Cl.
| G06F 7/00 | (2006.01) |
| G06F 17/00 | (2019.01) |
| G06F 11/14 | (2006.01) |
| G06F 16/23 | (2019.01) |

(Continued)

(52) U.S. Cl.
CPC ...... *G06F 11/1469* (2013.01); *G06F 11/1448* (2013.01); *G06F 11/1451* (2013.01); *G06F 11/2094* (2013.01); *G06F 16/2365* (2019.01); *G06F 16/2379* (2019.01); *G06F 16/273* (2019.01); *G06F 2201/80* (2013.01); *G06F 2201/82* (2013.01)

(58) Field of Classification Search
CPC .......... G06F 11/1469; G06F 17/30371; G06F 17/30377; G06F 2201/82; G06F 11/1453; G06F 2201/805; G06F 11/1451; G06F 2201/80

USPC ........................................................ 707/641
See application file for complete search history.

(56) References Cited

U.S. PATENT DOCUMENTS 7,596,570 B1 *  9/2009  Emigh ................ G06F 11/1453
8,554,762 B1    10/2013  O'Neill et al.
(Continued)

FOREIGN PATENT DOCUMENTS

WO    2019/168859 A2    9/2019

OTHER PUBLICATIONS

International Search Report and Written Opinion received for PCT Application U.S. Appl. No. PCT/US2019/019624 dated Nov. 11, 2019, 12 pages.

*Primary Examiner* — Binh V Ho
(74) *Attorney, Agent, or Firm* — FisherBroyles, LLP

(57) ABSTRACT

The disclosed computer-implemented method for performing a database backup for repairless restore may include (1) receiving replica data records representing copies of a database from each of a group of data storage nodes in a production cluster, (2) processing the replica data records in parallel without inter-node communication between the data storage nodes, (3) merging updates to the replica data records, (4) identifying stale or redundant data records in the updated replica data records, (5) discarding the stale or redundant data records from the updated replica data records to create a single copy of updated data records, and (6) restoring the copy of the updated data records to the production cluster by replicating the updated data records to the data storage nodes such that each of the updated data records is consistent thereby obviating subsequent repair. Various other methods, systems, and computer-readable media are also disclosed.

20 Claims, 5 Drawing Sheets

(51) Int. Cl.
*G06F 11/20* (2006.01)
*G06F 16/27* (2019.01)

(56) References Cited

U.S. PATENT DOCUMENTS

| | | | | |
|---|---|---|---|---|
| 8,983,952 B1* | 3/2015 | Zhang | ............... | G06F 11/00 |
| | | | | 707/736 |
| 10,025,673 B1* | 7/2018 | Maccanti | ............ | G06F 11/1451 |
| 10,496,498 B1* | 12/2019 | Choudhuri | ........ | G06F 11/1448 |
| 2005/0246398 A1* | 11/2005 | Barzilai | ............ | G06F 11/1448 |
| 2008/0147821 A1* | 6/2008 | Dietrich | ............ | G06F 16/1834 |
| | | | | 709/216 |
| 2009/0125522 A1* | 5/2009 | Kodama | ............ | H04L 9/0891 |
| 2009/0204631 A1* | 8/2009 | Pomroy | ............ | G06F 21/6227 |
| 2010/0145807 A1* | 6/2010 | Kobres | ............ | G06Q 30/0601 |
| | | | | 705/14.66 |
| 2012/0124092 A1* | 5/2012 | Teranishi | ............ | G06F 21/6218 |
| | | | | 707/783 |
| 2012/0226664 A1* | 9/2012 | Habermann | ............ | G06F 16/21 |
| | | | | 707/641 |
| 2013/0151494 A1* | 6/2013 | Dhamankar | ............ | G06F 16/21 |
| | | | | 707/703 |
| 2014/0149356 A1* | 5/2014 | Agarwal | ............ | G06F 16/245 |
| | | | | 707/652 |
| 2015/0242339 A1* | 8/2015 | Coronado | ............ | G06F 12/1491 |
| | | | | 711/145 |
| 2016/0210470 A1* | 7/2016 | Rozenberg | ............ | G06F 16/22 |
| 2016/0378454 A1* | 12/2016 | Nekrestyanov | ............ | G06F 8/65 |
| | | | | 717/170 |
| 2017/0228290 A1* | 8/2017 | Maccanti | ............ | G06F 11/1469 |
| 2017/0228417 A1* | 8/2017 | Maccanti | ............ | G06F 11/1469 |
| 2017/0262345 A1* | 9/2017 | Wang | ............ | G06F 11/2094 |
| 2017/0371547 A1* | 12/2017 | Fruchtman | ............ | G06F 11/1448 |
| 2018/0107561 A1* | 4/2018 | Bender | ............ | G06F 11/1451 |
| 2018/0107563 A1* | 4/2018 | Bender | ............ | G06F 16/148 |
| 2018/0300203 A1* | 10/2018 | Kathpal | ............ | G06F 16/278 |
| 2019/0018984 A1* | 1/2019 | Setty | ............ | H04L 63/14 |

\* cited by examiner

SYSTEMS AND METHODS FOR PERFORMING A DATABASE BACKUP FOR REPAIRLESS RESTORE

BACKGROUND

Modern enterprises often require large database configurations for storing vast amounts of data utilized in providing a variety of customer services and products such as electronic commerce, computer hardware and software, online search engines, and streaming media. For example, a software services company may deploy a database having thousands of nodes for storing terabytes (or even petabytes) of customer, product, and/or services data. To ensure data reliability, an enterprise may deploy a non-relational database having a high degree of fault tolerance and high read performance such as a non-structured query language (NoSQL) database.

Traditionally, NoSQL database systems replicate each data record in a database multiple times across the nodes of a cluster to ensure reliability. However, in providing this functionality, these systems may generate large numbers of redundant or obsolete data records. Thus, when a backup of the database is performed, data records from different nodes (including the redundant or obsolete data records) are backed-up individually leading to inconsistencies when performing a data restore operation. To resolve these inconsistencies, traditional systems utilize a repair operation that reconciles data across a system cluster by reading the data records and exchanging data currency levels among the nodes (to update any redundant or obsolete data records). For large clusters with a large amount of data, this repair operation is an expensive process that may take days to complete before the system cluster is available for regular input/output operations. The instant disclosure, therefore, identifies and addresses a need for systems and methods for performing a database backup for repairless restore.

SUMMARY

As will be described in greater detail below, the instant disclosure describes various systems and methods for performing a database backup for repairless restore.

In one example, a computer-implemented method for performing a database backup for repairless restore may include (1) receiving, during a database backup operation by a reconciliation node in a backup cluster, replica data records representing copies of a database from each of a plurality of data storage nodes in a production cluster, such that all replicas of a single key are received by a single one node, (2) processing the replica data records in parallel without inter-node communication between the data storage nodes, (3) merging, updates to the replica data records, (4) identifying stale or redundant data records in the updated replica data records, (5) discarding the stale or redundant data records from the updated replica data records to create a single copy of updated data records, and (6) restoring the copy of the updated data records to the production cluster by replicating the updated data records to each of the data storage nodes such that each of the updated data records is consistent thereby obviating subsequent repair.

In some examples, the replica data records may be processed in parallel without inter-node communication by processing the replica data records locally within each of a group of the reconciliation nodes in the backup cluster. In some examples, merging updates to the replica data records may include merging updates to one or more data columns in the replica data records made over multiple time periods.

In some examples, the updated data records may include a re-creation of the database. In some examples, the replica data records may share a database key on each of the data storage nodes. In some examples, the production cluster may include a non-relational database cluster. In some examples, the backup cluster may include an instance of the non-relational database cluster.

In one embodiment, a system for implementing the above-described method may include (1) a receiving module, stored in memory, that receives, during a database backup operation by a reconciliation node in a backup cluster, replica data records representing copies of a database from each of a plurality of data storage nodes in a production cluster, such that all replicas of a single key are received by a single one node, (2) a processing module, stored in memory, that processes the replica data records in parallel without inter-node communication between the data storage nodes, (3) a merging module, stored in memory, that merges updates to the replica data records, (4) an identification module, stored in memory, that identifies stale or redundant data records in the updated replica data records, (5) a discarding module, stored in memory, that discards the stale or redundant data records from the updated replica data records to create a single copy of updated data records, (6) a restoring module, stored in memory, that restores the copy of the updated data records to the production cluster by replicating the updated data records to each of the data storage nodes such that each of the updated data records is consistent thereby obviating subsequent repair, and (7) at least one physical processor configured to execute the receiving module, the processing module, the merging module, the identification module, the discarding module, and the restoring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, during a database backup operation by a reconciliation node in a backup cluster, replica data records representing copies of a database from each of a plurality of data storage nodes in a production cluster, such that all replicas of a single key are received by a single one node, (2) process the replica data records in parallel without inter-node communication between the data storage nodes, (3) merge updates to the replica data records, (4) identify stale or redundant data records in the updated replica data records, (5) discard, by the reconciliation node, the stale or redundant data records from the updated replica data records to create a single copy of updated data records, and (6) restore the copy of the updated data records to the production cluster by replicating the updated data records to each of the data storage nodes such that each of the updated data records is consistent thereby obviating subsequent repair.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
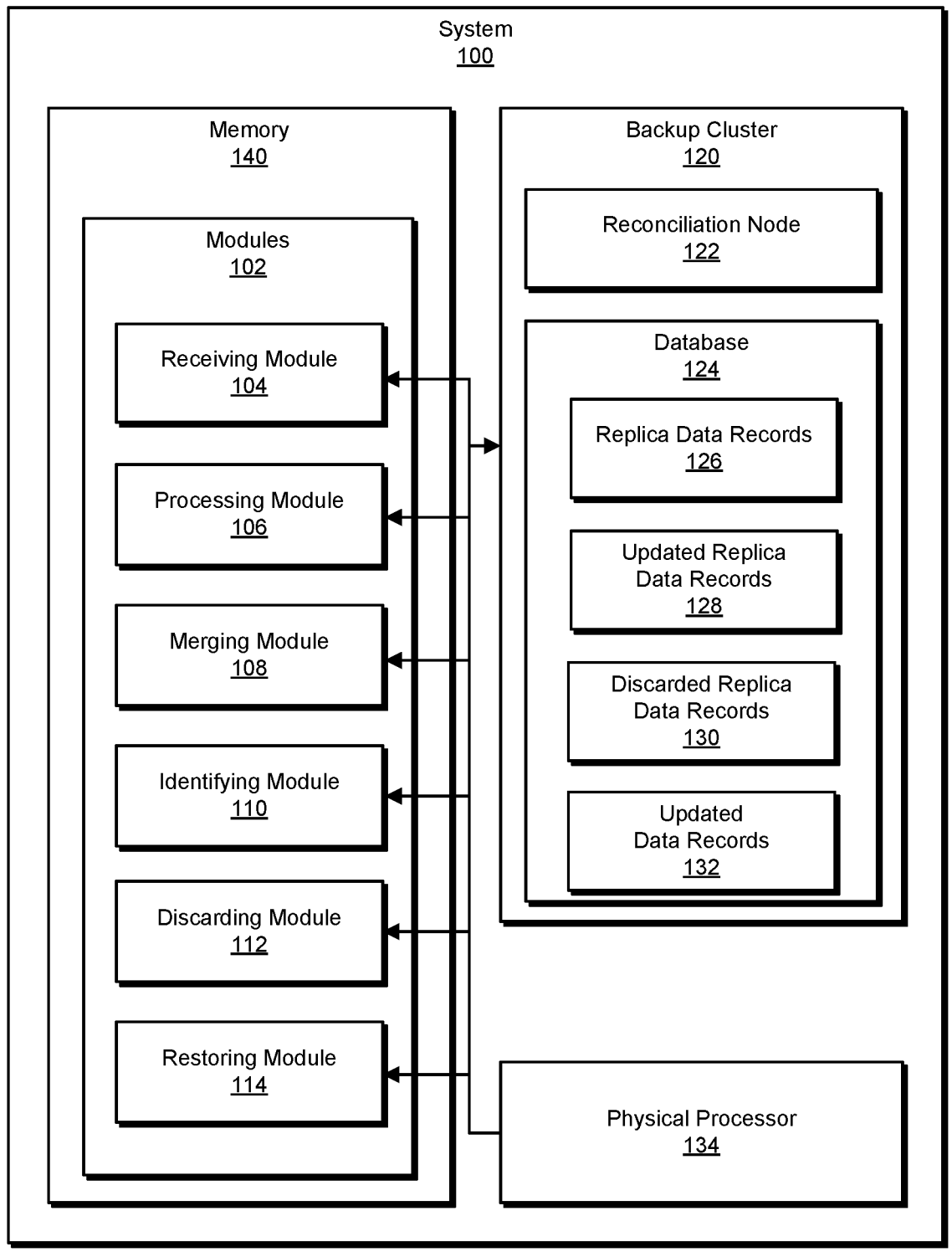
FIG. 1 is a block diagram of an example system for performing a database backup for repairless restore.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing a database backup for repairless restore. As will be explained in greater detail below, by performing reconciliation in which the processing of database records is performed in parallel on a backup cluster and merging updates to eliminate stale or redundant database records, the various systems and methods described herein may be able to generate a single consistent copy of a database, for restoring back to a production cluster for replication in a NoSQL or non-relational database system, without the database system having to undergo a time consuming repair process to reconcile the database records for consistency, thereby potentially resulting in faster restore operations from a backup.

Moreover, the systems and methods described herein may improve the functioning and/or performance of a computing device by reducing the size of a database, thereby decreasing processing and memory resources utilized by the computing device in performing database backup and restore operations. These systems and methods may also improve the fields of cluster computing and/or backup systems by providing faster restore operations from a NoSQL database backup.

Figure 2:
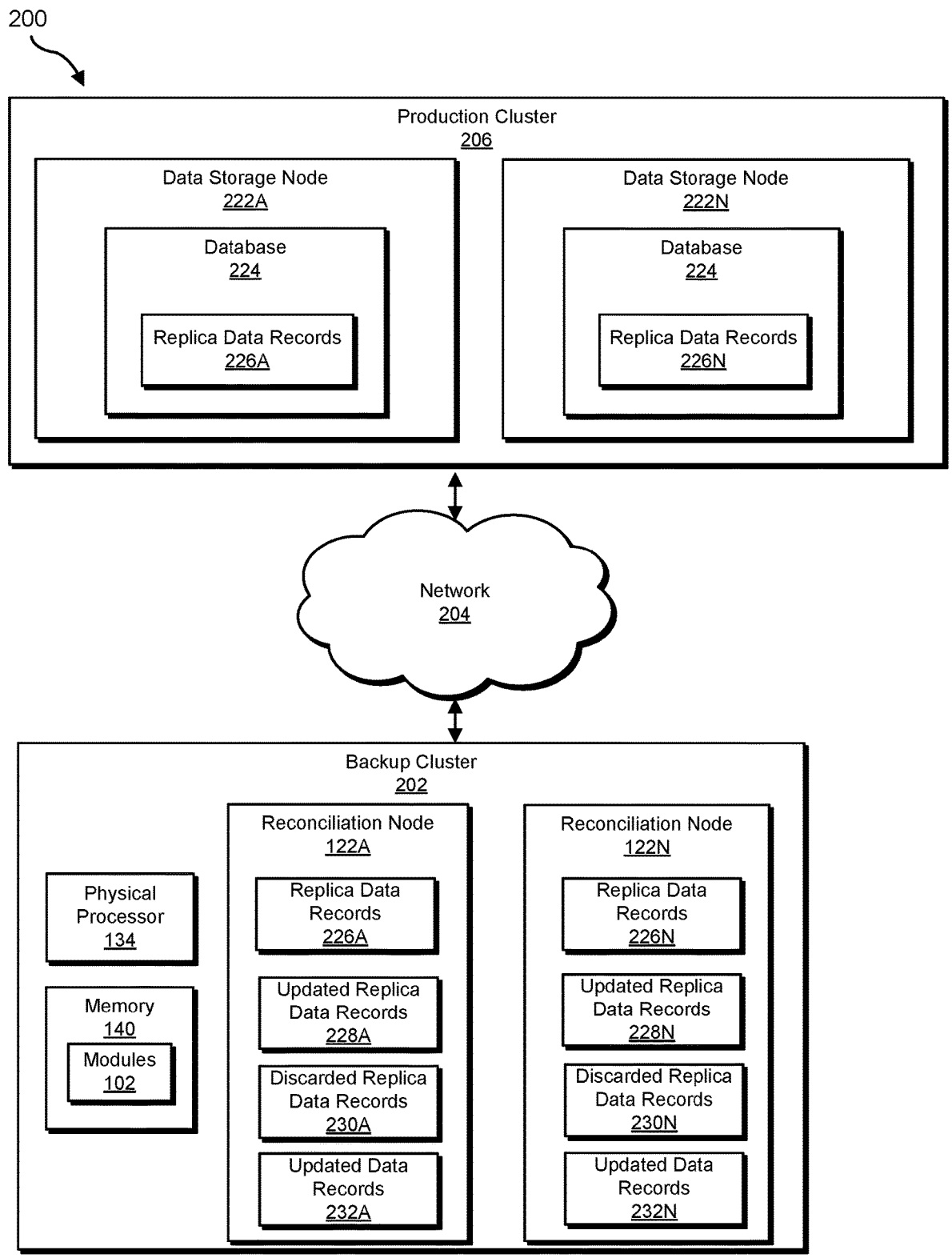
FIG. 2 is a block diagram of an additional example system for performing a database backup for repairless restore.

The following will provide, with reference to FIGS. 1-2, detailed descriptions of example systems for performing a database backup for repairless restore. Detailed descriptions of corresponding computer-implemented methods will also be provided in connection with FIG. 3. In addition, a detailed description of an example a data flow diagram for performing a repairless backup of a database will also be provided in connection with FIG. 4. In addition, a detailed description of replica data records used in an example system for performing a repairless backup of a database will also be provided in connection with FIG. 5.

FIG. 1 is a block diagram of example system 100 for performing a repairless backup of a database. As illustrated in this figure, example system 100 may include one or more modules 102 for performing one or more tasks. For example, and as will be explained in greater detail below, example system 100 may include a receiving module 104 that receives, during a database backup operation by a reconciliation node 122 in a backup cluster 120, replica data records 126 representing copies of a database 124. Example system 100 may additionally include a processing module 106 that processes replica data records 126 in parallel without inter-node communication between data storage nodes in a production cluster hosting database 124. Example system 100 may also include a merging module 108 that merges updates to replica data records 126. Example system 100 may additionally include an identification module 110 that identifies stale or redundant data records in updated replica data records 128. Example system 100 may also include a discarding module 112 that discards stale or redundant data records 127 from updated replica data records 128 to create a single copy of updated data records 132. Example system 100 may additionally include a restoring module 114 that restores updated data records 132 to a production cluster. Although illustrated as separate elements, one or more of modules 102 in FIG. 1 may represent portions of a single module or application.

The term "cluster," as used herein, generally refers to a non-relational database management system (e.g., a NoSQL database management system) that may include a NoSQL database. An example of a NoSQL database management system is the CASSANDRA database management system from the APACHE SOFTWARE FOUNDATION. Data in non-relational (or NoSQL) database management systems is "schema-less" and stored as key-value pairs across multiple nodes. Each node in a cluster has the same role such that there is no single point of failure. Data may be distributed across a cluster (so that each node contains different data), but there is no master as every node can service any request. In some examples, a cluster may include a production cluster including multiple nodes for storing data records and replica data records for a database. In some examples, a cluster may include a backup cluster that is an instance of the production cluster and utilized for backing up data records from the production cluster.

The term "reconciliation node," as used herein, generally refers to a data storage device, residing in a backup cluster, utilized for backing up database data records from a production cluster, incorporating any updates to the database data records, and restoring the updated database data records to the production cluster. In some examples, one or more reconciliation nodes may be utilized for backing up and restoring data records for a NoSQL database management system. In some examples, a reconciliation node may be a direct attached storage device.

The term "data storage node," as used herein, generally refers to a data storage device, residing in a production cluster utilized for storing data records and replica data records for a database. In some examples, each of multiple data storage nodes may be utilized for storing data records and multiple replica data records in a NoSQL database management system. In some examples, a data storage node may be a direct attached storage device.

The term "replica data records," as used herein, generally refers to copies of data records for a database in a cluster. In some examples, replica data records may include keyspaces (e.g., database tables) having columns representing database data in a NoSQL database management system.

In certain embodiments, one or more of modules 102 in FIG. 1 may represent one or more software applications or programs that, when executed by a computing device, may cause the computing device to perform one or more tasks.

For example, and as will be described in greater detail below, one or more of modules 102 may represent modules stored and configured to run on one or more computing devices, such as the devices illustrated in FIG. 2 (e.g., computing devices 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 134. Physical processor 134 generally represents any type or form of hardware-implemented processing unit capable of interpreting and/or executing computer-readable instructions. In one example, physical processor 134 may access and/or modify one or more of modules 102 stored in memory 140. Additionally or alternatively, physical processor 134 may execute one or more of modules 102 to facilitate performing a database backup for repairless restore. Examples of physical processor 134 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a backup cluster 202 in communication with a production cluster 206 via a network 204. In one example, all or a portion of the functionality of modules 102 may be performed by backup cluster 202 and/or any other suitable computing system. As will be described in greater detail below, one or more of modules 102 from FIG. 1 may, when executed by at least one processor of backup cluster 202, enable backup cluster 202 to perform a repairless backup of a database.

Backup cluster 202 generally represents any type or form of computing device capable of reading computer-executable instructions. For example, backup cluster 202 may include multiple server computers, that work and/or operate in conjunction with one another, representative of an instance of a NoSQL database management system. Additional examples of backup cluster 202 include, without limitation, storage servers, database servers, application servers, and/or web servers configured to run certain software applications and/or provide various storage, database, and/or web services.

Production cluster 206 generally represent any type or form of computing device capable of reading computer-executable instructions. For example, production cluster 206 may include multiple server computers, that work and/or operate in conjunction with one another, representative of a NoSQL database management system. Additional examples of production cluster 206 may include, without limitation, storage servers, database servers, application servers, and/or web servers configured to run certain software applications and/or provide various storage, database, and/or web services.

Network 204 generally represents any medium or architecture capable of facilitating communication or data transfer. In one example, network 204 may facilitate communication between backup cluster 202 and production cluster 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Backup cluster 202 may further include one or more reconciliation nodes, such as reconciliation nodes 122A and 122N. Each of reconciliation nodes 122A and 122N may further include replica data records 226A and 226N, updated replica data records 228A and 228N, discarded replica data records 230A and 230N, and updated data records 232A and 232N, respectively. Production cluster 206 may further include one or more data storage nodes, such as data storage nodes 222A and 222N. Each of data storage nodes 222A and 222N may further include copies of a database 224. Each of the copies of database 224 stored on data storage nodes 222A and 222N may include replica data records 226A and 226N, respectively.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
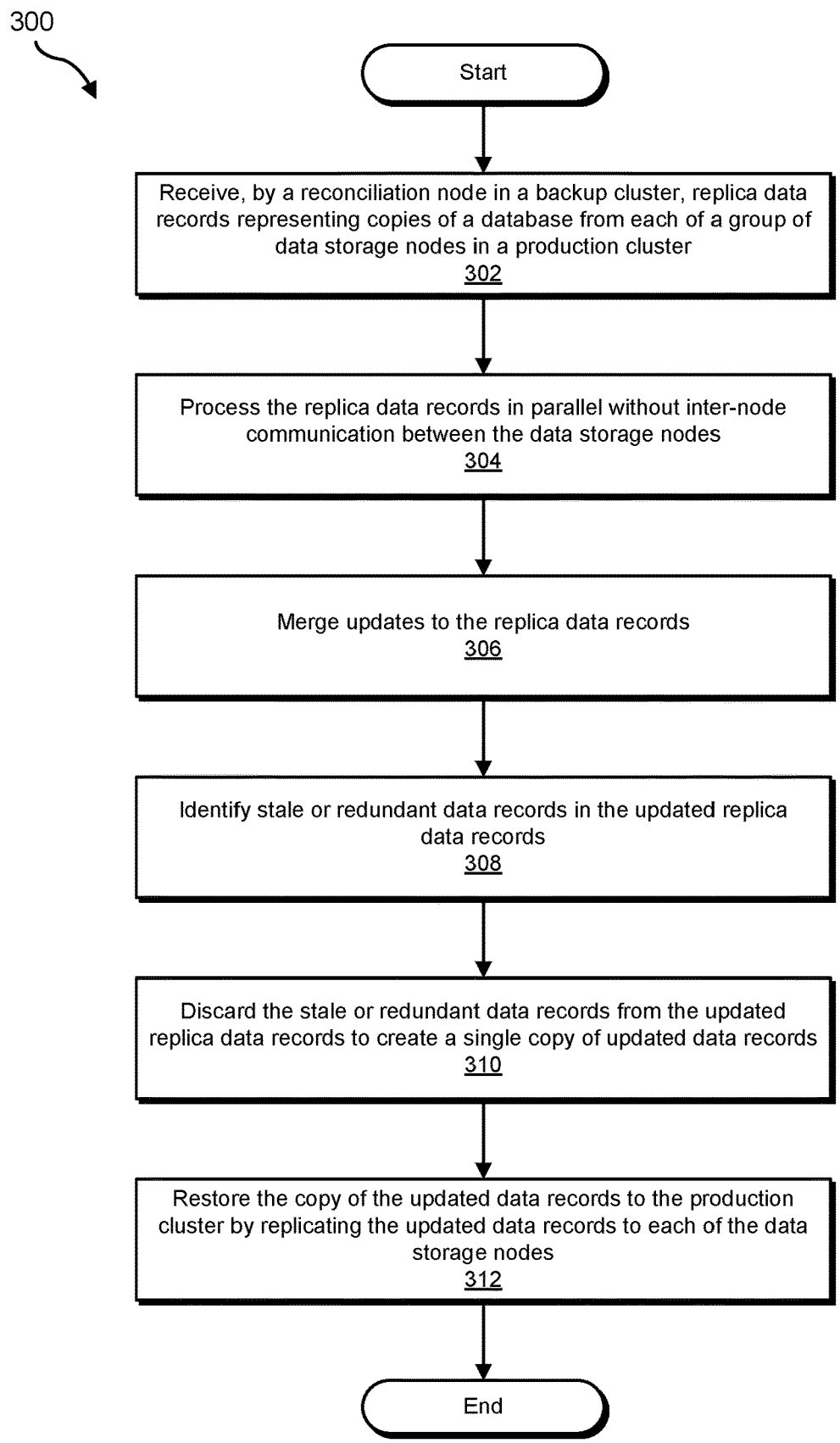
FIG. 3 is a flow diagram of an example method for performing a database backup for repairless restore.

FIG. 3 is a flow diagram of an example computer-implemented method 300 for performing a database backup for repairless restore. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may, receive, during a database backup operation by a reconciliation node in a backup cluster, replica data records representing copies of a database from each of a plurality of data storage nodes in a production cluster, such that all replicas of a single key are received by a single one node. For example, receiving module 104 may, as part of backup cluster 222 in FIG. 2, receive replica data records 226A from data storage node 222A (in production node 206) on reconciliation node 122A and receive replica data records 226N from data storage node 222N (in production node 206) on reconciliation node 122N. In some examples, each of replica data records 226A and 226N may share a database key on each of data storage nodes 222A and 222N.

Receiving module 104 may receive replica data records 226A and 226N in a variety of ways. In one example, receiving module 104 may receive replica data records 226A and 226N during a backup operation for backing up database 224 from data storage nodes 222A and 222N on production cluster 206.

At step 304 in FIG. 3, one or more of the systems described herein may process, on the backup cluster, the replica data records in parallel without inter-node communication between the data storage nodes on the production cluster. For example, processing module 106 may, as part of backup cluster 202, process replica data records 226A and 226N without communicating with data storage nodes 122A and 122N on production cluster 206. Processing module 106 may process replica data records 226A and 226N in a variety of ways. In one example, processing module 106 may process replica data records 226A and 226N locally within reconciliation nodes 122A and 122N in backup cluster 202.

At step 306 in FIG. 3, one or more of the systems described herein may merge, on the backup cluster, updates to the replica data records. For example, merging module 108 may, as part of backup cluster 202, merge updates to replica data records 226A and 226N to create updated replica data records 228A and 228N on reconciliation nodes 122A and 122N.

Merging module 108 may merge updates to replica data records 226A and 226N in a variety of ways. In one example, merging module 108 may merge updates made to one or more data columns in replica data records 226A and 226N over multiple time periods. For example, merging module 108 may communicate with production cluster 206 and perform a record synthesis operation that merges updates to different columns at different times to re-create a complete data record for replica data records 226A and 226N. The re-created data record may be represented by updated replica data records 228A and 228N.

Returning now to FIG. 3, at step 308, one or more of the systems described herein may identify, on the backup cluster, stale or redundant data records in the updated replica data records. For example, identifying module 110 may, as part of backup cluster 202, identify stale or redundant data records in updated replica data records 228A and 228N.

Identifying module 110 may identify stale or redundant data records in a variety of ways. In some examples, identifying module 110 may identify stale data or redundant records based on a timestamp associated with data records in updated replica data records 228A and/or 228N after the merge operation has been performed at step 306. In one example, identical data records having different timestamps may be identified with the older data records being marked as stale. In another example, multiple identical data records having the same timestamp may be identified with all but one of the data records being marked as redundant.

At step 310 in FIG. 3, one or more of the systems described herein may discard, on the backup cluster, the stale or redundant data records identified at step 308. For example, discarding module 112 may, as part of backup cluster 202, discard stale or redundant data records (e.g., discarded replica data records 230A and 230N) from updated replica data records 228A and 228N. Discarding module 112 may discard stale or redundant data records in a variety of ways. In one example, discarding module 112 may delete discarded replica data records 230A and 230N identified as stale and/or redundant. Following the discarding of stale and/or redundant data records from updated replica data records 228A and 228N, a single copy of updated data records 232A and 232N may be created on each of reconciliation nodes 122A and 122N. In some examples, updated data records 232A and 232N may represent a re-creation of database 224 on production cluster 206.

At step 312 in FIG. 3, one or more of the systems described herein may restore, from the backup cluster, the copy of the updated data records to the production cluster by replicating the updated data records to each of the data storage nodes on the production cluster. For example, restoring module 114 may, as part of backup cluster 202, replicate updated data records 232A and 232N back to data storage nodes 222A and 222N on production cluster 206, as part of a restore operation following a backup of database 224.

Restoring module 114 may replicate updated data records 232A and 232N back to data storage nodes 222A and 222N on production cluster 206 in a variety of ways. In one example, restoring module 114 may copy updated data records 232A and 232N to data storage nodes 222A and 222N, respectively, from reconciliation nodes 122A and 122N on backup cluster 202. Following the restoring operation, each of the updated data records 232A and 232N is consistent across all replicas on production cluster 206 (e.g., the restoring operation is repairless). As a result, production cluster 206 is no longer required to reconcile all data records and replica data records in a database to make them consistent following a database restore operation.

Figure 4:
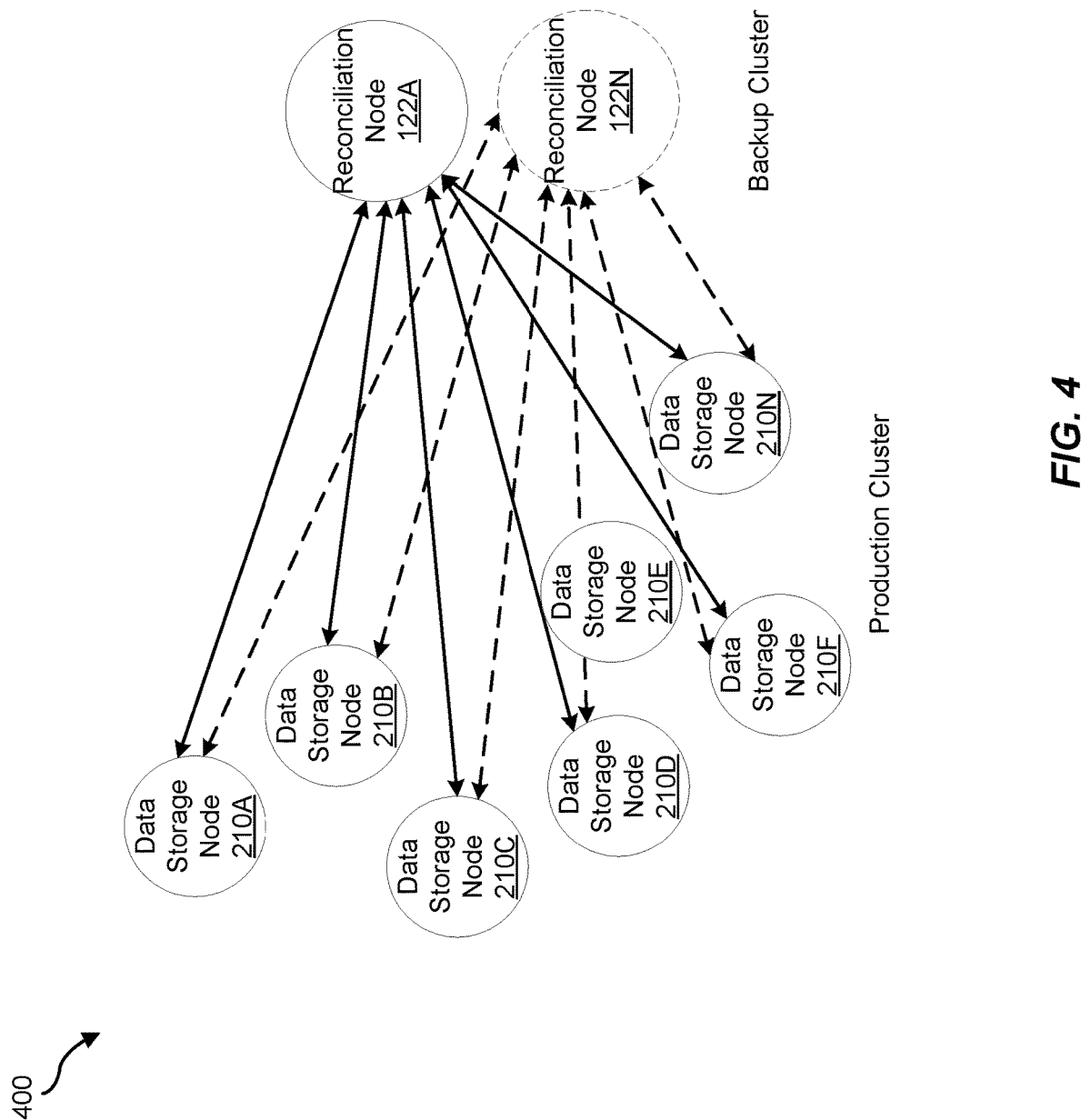
FIG. 4 is a data flow diagram for an example system for performing a database backup for repairless restore.

FIG. 4 is a data flow diagram 400 for an example system for performing a database backup for repairless restore. As shown in FIG. 4, a production cluster (e.g., production cluster 206 of FIG. 2) may include data storage nodes 210A, 210B, 210C, 210D, 210E, 210F, and 210N. As also shown in FIG. 4, a backup cluster (e.g., backup cluster 202 of FIG. 2) may include reconciliation nodes 122A and 122N.

In one example, reconciliation node 122A may receive replica data records from each of data storage nodes 210A-210N and reconciliation node 122N may also receive replica data records from each of data storage nodes 210A-210N. In this example, data records on each of data storage nodes 210A-210N in the production cluster may be associated with same keys and transferred to a single reconciliation node (e.g., reconciliation node 122A and/or reconciliation node 122N) in the backup cluster. As a result of the transfer, data reconciliation may occur in parallel within each of reconciliation nodes 122A and/or reconciliation node 122N without any internode communication. In this example, reconciliation nodes 122A and 122N may also perform record synthesis by while iterating over the data records by merging the columns of the same key from different database tables (e.g., sorted string (SS) tables). In this example, reconciliation nodes 122A and 122N may also perform data deduplication by identifying and removing stale and duplicate data records (e.g., replica data).

Figure 5:
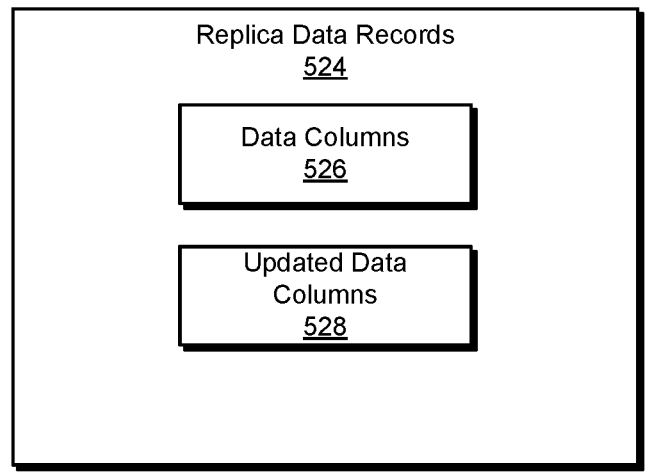
FIG. 5 is a block diagram of replica data records used in an example system for performing a database backup for repairless restore.

FIG. 5 is a block diagram of replica data records used in an example system for performing a database backup for repairless restore. As shown in FIG. 5, replica data records 524 may include data columns 526 and updated data columns 528. In some examples, data columns 526 may be updated by merging module 108 of FIG. 2 to create updated data columns 528.

In one example, merging module 108 may merge updates made to data columns 526 on production cluster 206 over multiple time periods. The multiple time periods may be identified by timestamps associated with each of the data columns 526 in replica data records 524 stored on one or more data storage nodes 222A and/or 222N in production cluster 206 shown in FIG. 2.

As explained above in connection with FIGS. 1-5, an instance of a NoSQL database management system cluster (e.g., a backup cluster) may be utilized to perform reconciliation of data on storage nodes in the backup cluster during a database backup. Different replica data from multiple nodes in a NoSQL database production cluster is brought to the same node in the backup cluster. Therefore, during reconciliation, the backup cluster processes all data locally within nodes in the backup cluster. As a result, database data may be processed in parallel on the backup cluster without inter-node communication. At the time the reconciliation is performed, the backup cluster may also perform database record synthesis to merge updates to different columns of database data at different times such that a complete record of the database is re-created. After performing the data record synthesis, the backup cluster is then able to identify stale or redundant replica data records and discard these replicas.

By performing reconciliation in which the processing of database records is performed in parallel on a backup cluster and merging updates to eliminate stale or redundant database records, the backup cluster may be able to generate a single consistent copy of a database, for restoring back to a production cluster for replication in a NoSQL database management system, without the database management system having to undergo a time consuming repair process to reconcile the database records for consistency, thereby potentially resulting in faster restore operations from a backup.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing a database backup for repairless restore, at least a portion of the method being performed by a computing device comprising at least one processor, the method comprising:
   receiving, during a database backup operation by a reconciliation node in a backup cluster, replica data records representing copies of a database from each of a plurality of data storage nodes in a production cluster, such that all replicas of a single key are received by a single one node;
   processing the replica data records in parallel without inter-node communication between the data storage nodes;
   merging updates to the replica data records, wherein merging the updates comprises:
      communicating with the production cluster; and
      performing a record synthesis operation that merges updates to a plurality of different data columns in the replica data records at a plurality of different times to re-create a complete data record for the replica data records;
   identifying stale or redundant data records in the updated replica data records;
   discarding the stale or redundant data records from the updated replica data records to create a single copy of updated data records; and
   restoring the copy of the updated data records to the production cluster by replicating the updated data records to each of the data storage nodes, wherein each of the updated data records is consistent thereby obviating subsequent repair.

2. The method of claim 1, wherein processing the replica data records in parallel without inter-node communication between the data storage nodes comprises processing the replica data records locally within each of a plurality of the reconciliation nodes in the backup cluster.

3. The method of claim 1, wherein the updated data records comprises a re-creation of the database.

4. The method of claim 1, wherein the replica data records share a database key on each of the data storage nodes.

5. The method of claim 1, wherein the production cluster comprises a non-relational database cluster.

6. The method of claim 5, wherein the backup cluster comprises an instance of the non-relational database cluster.

7. A system for performing a database backup for repairless restore, the system comprising:
   a receiving module, stored in memory, that receives, during a database backup operation by a reconciliation node in a backup cluster, replica data records representing copies of a database from each of a plurality of data storage nodes in a production cluster, such that all replicas of a single key are received by a single one node;
   a processing module, stored in memory, that processes the replica data records in parallel without inter-node communication between the data storage nodes;
   a merging module, stored in memory, that merges updates to the replica data records, wherein the updates are merged by:
      communicating with the production cluster; and
      performing a record synthesis operation that merges updates to a plurality of different data columns in the replica data records at a plurality of different times to re-create a complete data record for the replica data records;
   an identification module, stored in memory, that identifies stale or redundant data records in the updated replica data records;
   a discarding module, stored in memory, that discards the stale or redundant data records from the updated replica data records to create a single copy of updated data records;
   a restoring module, stored in memory, that restores the copy of the updated data records to the production cluster by replicating the updated data records to each of the data storage nodes, wherein each of the updated data records is consistent thereby obviating subsequent repair; and
   at least one physical processor configured to execute the receiving module, the processing module, the merging module, the identification module, the discarding module, and the restoring module.

8. The system of claim 7, wherein the processing module processes the replica data records in parallel without inter-node communication between the data storage nodes by processing the replica data records locally within each of a plurality of the reconciliation nodes in the backup cluster.

9. The system of claim 7, wherein the updated data records comprises a re-creation of the database.

10. The system of claim 7, wherein the replica data records share a database key on each of the data storage nodes.

11. The system of claim 7, wherein the production cluster comprises a non-relational database cluster.

12. The system of claim 11, wherein the backup cluster comprises an instance of the non-relational database cluster.

13. A non-transitory computer-readable medium comprising one or more computer-executable instructions that, when executed by at least one processor of a computing device, cause the computing device to:
   receive, during a database backup operation by a reconciliation node in a backup cluster, replica data records representing copies of a database from each of a plurality of data storage nodes in a production cluster, such that all replicas of a single key are received by a single one node;
   process the replica data records in parallel without inter-node communication between the data storage nodes;
   merge updates to the replica data records, wherein the updates are merged by:
      communicating with the production cluster; and performing a record synthesis operation that merges updates to a plurality of different data columns in the replica data records at a plurality of different times to re-create a complete data record for the replica data records;

identify stale or redundant data records in the updated replica data records;

discard the stale or redundant data records from the updated replica data records to create a single copy of updated data records; and restore the copy of the updated data records to the production cluster by replicating the updated data records to each of the data storage nodes, wherein each of the updated data records is consistent thereby obviating subsequent repair.

14. The non-transitory computer-readable medium of claim 13, wherein the one or more computer executable instructions cause the computing device to process the replica data records in parallel without inter-node communication between the data storage nodes by processing the replica data records locally within each of a plurality of the reconciliation nodes in the backup cluster.

15. The non-transitory computer-readable medium of claim 13, wherein the updated data records comprises a re-creation of the database.

16. The non-transitory computer-readable medium of claim 13, wherein the replica data records share a database key on each of the data storage nodes.

17. The non-transitory computer-readable medium of claim 13, wherein the production cluster comprises a non-relational database cluster.

18. The computer-implemented method of claim 1, wherein identifying the stale or redundant data records in the updated replica data records comprises:

identifying an older data record in a plurality of identical updated replica data records as stale based on a timestamp, wherein each of the updated replica data records is associated with a different timestamp; or identifying all but one of a plurality of identical updated data records as redundant based on the timestamp, wherein each of the updated replica data records is associated with a same timestamp.

19. The system of claim 7, wherein the identification module identifies the stale or redundant data records in the updated replica data records by:

identifying an older data record in a plurality of identical updated replica data records as stale based on a timestamp, wherein each of the updated replica data records is associated with a different timestamp; or identifying all but one of a plurality of identical updated data records as redundant based on the timestamp, wherein each of the updated replica data records is associated with a same timestamp.

20. The non-transitory computer-readable medium of claim 13, wherein the one or more computer-executable instructions cause the computing device to identify stale or redundant data records in the updated replica data records by:

identifying an older data record in a plurality of identical updated replica data records as stale based on a timestamp, wherein each of the updated replica data records is associated with a different timestamp; or identifying all but one of a plurality of identical updated data records as redundant based on the timestamp, wherein each of the updated replica data records is associated with a same timestamp.

* * * * *